April 8, 1969  W. G. CADY  3,437,851
PIEZOELECTRIC TRANSDUCER
Filed Aug. 17, 1966  Sheet 1 of 2

INVENTOR.
WALTER G. CADY
BY Howard A. Silber
ATTORNEY

April 8, 1969     W. G. CADY     3,437,851

PIEZOELECTRIC TRANSDUCER

Filed Aug. 17, 1966     Sheet 2 of 2

| ELECTRIC POLARIZATION PARALLEL TO | EXTENSIONAL OR COMPRESSIONAL STRAIN | | | SHEARING STRAIN PARALLEL TO | | |
|---|---|---|---|---|---|---|
| | | | | YZ PLANE | XZ PLANE | XY PLANE |
| X–AXIS | $e_{11}$ | $e_{12}$ | $e_{13}$ | $e_{14}$ | $e_{15}$ | $e_{16}$ |
| Y–AXIS | $e_{21}$ | $e_{22}$ | $e_{23}$ | $e_{24}$ | $e_{25}$ | $e_{26}$ |
| Z–AXIS | $e_{31}$ | $e_{32}$ | $e_{33}$ | $e_{34}$ | $e_{35}$ | $e_{36}$ |

INVENTOR.
WALTER G. CADY

BY Howard A. Silber

ATTORNEY

United States Patent Office 3,437,851
Patented Apr. 8, 1969

3,437,851
PIEZOELECTRIC TRANSDUCER
Walter G. Cady, Providence, R.I., assignor to North American Rockwell Corporation, a corporation of Delaware
Filed Aug. 17, 1966, Ser. No. 572,969
Int. Cl. H01v 7/00
U.S. Cl. 310—9.6                                    9 Claims

ABSTRACT OF THE DISCLOSURE

A piezoelectric transducer independently responsive to forces along two orthogonal axes. The transducer comprises a piezoelectric crystal of a homogeneous material having non-zero stress coefficients along one diagonal of a 2 x 2 submatrix of shearing stress coefficients and having zero-valued stress coefficients along the other submatrix diagonal. Two pair of electrical contacts are disposed on opposite sides of the transducer, by means of which electrical signals are obtained independently related to mechanical shearing forces exerted on the transducer along two orthogonal axes.

This invention relates to a transducer, and more particularly to a piezoelectric transducer responsive to forces along two orthogonal axes. The transducer provides electrical output signals independently related to mechanical shearing forces along two mutually perpendicular directions, or alternatively, produces mechanical forces along two orthogonal directions independently responsive to separate electrical input signals.

In the past, piezoelectric transducers independently responsive to mechanical shearing forces or electric fields parallel to more than one orthogonal axis have been of two general types. The first type utilized two piezoelectric elements mounted at right angles to each other, each element being used to sense the forces normal to one of its faces. The second type utilized a tubular shaped piezoelectric element having a slit along its entire length. Three electrodes were used with the tubular transducer, one electrode was mounted adjacent each side of the slit, and a common electrode was located diagonally opposite the slit. Mechanical motion of one hemicylindrical portion of the transducer resulted in an electrical output between the common electrode and the electrode on the same side of the slit as the mechanical force applied. Thus, these prior art piezoelectric transducers suffers the limitations either of requiring two piezoelectric elements, or of requiring the use of an element having a slit tubular configuration.

The transducer which is the subject of the invention described herein comprises a single piezoelectric element whose electric polarization along a first axis is interrelated to shearing forces only parallel to either the same axis or a second mutually perpendicular axis. Further, the electric polarization of the element along a second axis orthogonal to the first axis is responsive to a shearing force only along a direction of force perpendicular to that force to which the first electric polarization is responsive. Moreover, if an electrical force is applied across a first or second orthogonal axis of the crystal, independent shearing forces along two mutually perpendicular axes will be generated.

It is therefore an object of this invention to provide a transducer for converting shearing forces in two orthogonal directions into two electrical signals independently responsive to the applied shearing forces.

It is another object of this invention to provide a transducer for converting two electrical signals independently into motion in two orthogonal directions of a single piezoelectric element.

It is another object of this invention to provide means for sensing or controlling small vibratory motion in separate planes of a piezoelectric material.

A further object of this invention is to use the strain/polarization characteristics of a piezoelectric material to measure energy applied to the material along separate axes.

Further objects and features of the invention will become apparent from the following description and drawings which are utilized for illustrative purposes only.

Figure 1:
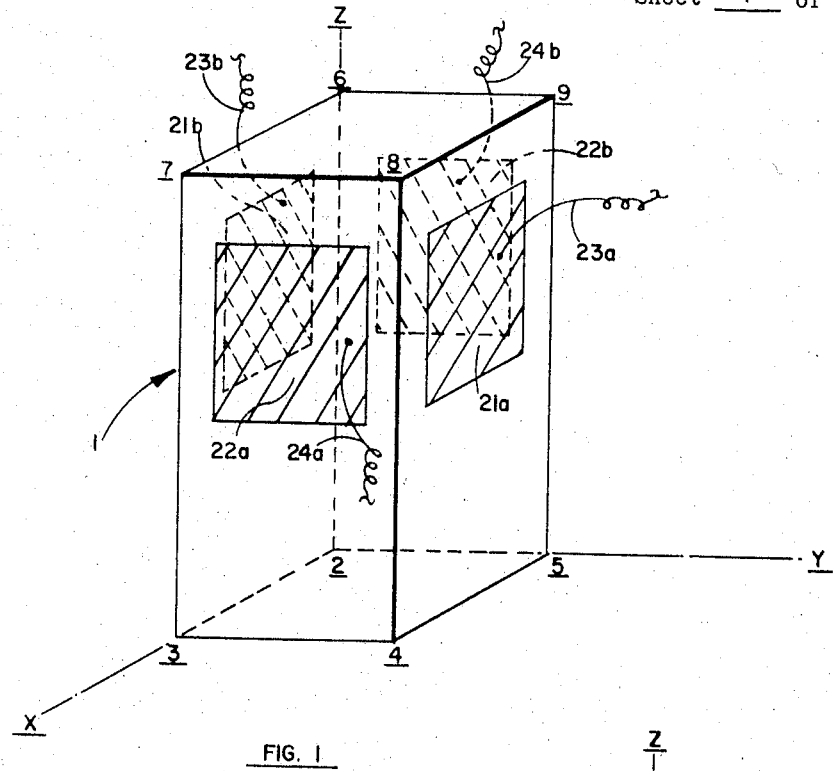
FIG. 1 shows one embodiment of the invention, including the piezoelectric element and electrical contact means.

Referring now to FIG. 1 there is shown a bar 1 of piezoelectric material, preferably of rectangular cross section in its quiescent state, with a first pair of electrodes 21a and 21b affixed to its major faces parallel to the XZ plane, and a second pair of electrodes 22a and 22b affixed to the surfaces parallel to the YZ plane. Electrodes 21a and 21b, and their associated electrical conductors 23a and 23b, comprise first means for conducting electrical energy to or from bar 1; electrodes 22a and 22b, in conjunction with electrical conductors 24a and 24b, comprise second means for conducting electrical energy to or from bar 1.

Figure 3B:
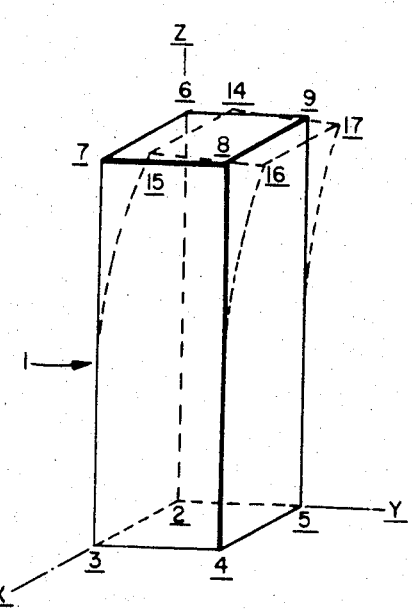
FIG. 3b shows one embodiment of the piezoelectric element, both in its quiescent state and when sheared in the YZ plane.
Figure 3A:
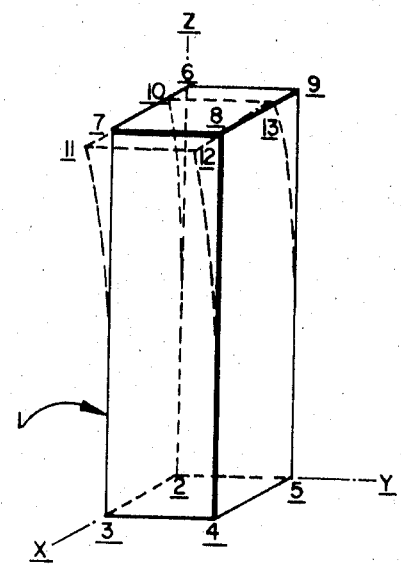
FIG. 3a shows one embodiment of the piezoelectric element, both in its quiescent state and when sheared in the XZ plane.
Figures 2, 4:
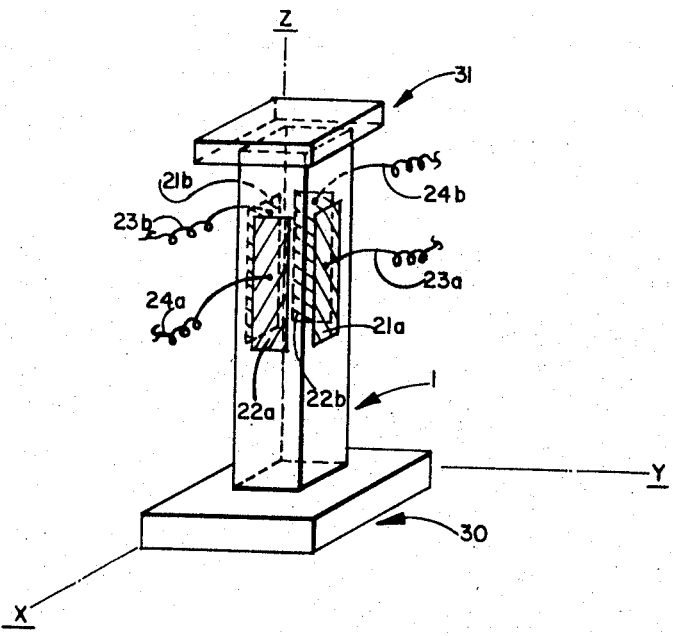
FIG. 2 shows the matrix of piezoelectric stress coefficients.
FIG. 4 shows another embodiment of the invention, including an inertial mass.

The piezoelectric material selected for use in the transducer should exhibit certain characteristics which may be understood from the following discussion taken in conjunction with FIGS 2, 3a and 3b.

In general, a piezoelectric material is one which becomes electrically polarized when it is stressed mechanically, or alternatively, which becomes strained when subjected to an electric field.

The electric polarization has components $P_1$, $P_2$ and $P_3$ which are parallel respectively to the principal crystallographic axes of the material. These polarization components are related to the various strains developed in the material when it is stressed mechanically by the relationship $$P_m = e_{mh} S_h \quad \begin{matrix} m = 1, 2, 3 \\ h = 1, 2 \ldots 6 \end{matrix} \quad (1)$$

wherein $e_{mh}$ is one of the eighteen piezoelectric stress coefficients, as indicated generally in FIG. 2 and $S_h$ is a component of strain. The subscript $m$ indicates the axis of polarization, while the subscript $h$ indicates the type of strain.

As indicated in FIG. 2, the stress coefficients having subscript $h$ values of 1, 2 or 3 are related to extensional or compressional strains, and are not of primary importance with respect to the subject transducer. The stress coefficients shown in the right hand side of FIG. 2, and having subscript $h$ values of 4, 5 and 6 are related to shearing strains and are of importance in describing the characteristics of the piezoelectric material selected for the transducer. In all but the triclinic hemihedral class of piezoelectric crystals, one or more of the coefficients are zero.

For ease of exposition, assume that a piezoelectric crystal has been prepared in the shape of a right parallelepiped, and that its principal crystallographic axes are normal to its sides, as shown, e.g., in FIGS. 1, 3a or 3b. The electric polarization components $P_1$, $P_2$ and $P_3$ respectively, then may be considered normal to the YZ, XZ, and XY planes and parallel to the illustrated X, Y and Z coordinates. Further, assume that the crystal has non-vanishing piezoelectric stress coefficients $e_{15}$ and $e_{24}$.

When a piezoelectric crystal of the type described in the preceding paragraph is subjected to a shearing force in the XZ plane, as shown in FIG. 3a, the bar will be flexed from its quiescent position (shown by corners 2 through 9 inclusive) to a new position indicated by points 2, 3, 4, 5, 10, 11, 12 and 13. The resultant strain will produce an electric polarization component $P_1 = e_{15}S_5$, wherein the subscript $h=5$ is indicative of a shearing strain parallel to the XZ plane. The polarization component $P_1$ will be parallel to the X-axis, that is, in the same direction as the applied shearing force. Were the bar provided with means for conducting electrical energy from the bar, such as electrodes 22a and 22b, and electrical conductors 24a and 24b (see FIG. 1) an output voltage would be obtained across conductors 24a and 24b which was responsive to the applied shearing force.

Similarly, a shearing force in the YZ plane will result in a movement of the bar from its quiescent position (as indicated by points 2 through 9 inclusive in FIG. 3b) to a new orientation, indicated by points 2, 3, 4, 5, 14, 15, 16, 17. An electric polarization component $P_2 = e_{24}S_4$ will result, which component is parallel to the Y axis. Were the bar provided with means for conducting electrical energy from faces 2, 3, 6, 7 and 4, 5, 8, 9 (such as electrodes 21a and 21b and conductors 23a and 23b of FIG. 1) an output voltage would be obtained which was responsive to the shearing force applied in the YZ plane.

Using the same example, and referring again to FIG. 2, let us assume that stress tensor coefficients $e_{14}$ and $e_{24}$ both are non-zero in value. Now when the bar is subjected to a shearing force along the YZ plane, as shown in FIG. 3b, two electric polarization components $P_1 = e_{14}S_4$ and $P_2 = e_{24}S_4$ result. Thus, if the means shown in FIG. 1 for conducting electrical energy from the bar were used, an output voltage across conductors 24a and 24b would be obtained when the bar was subjected to a shearing force parallel to the YZ plane ($P_1 = e_{14}S_4$) and also when it was subjected to a shearing force parallel to the XZ plane ($P_1 = e_{15}S_5$). This situation is undesirable, since the electric polarization parallel to the X axis, and hence the output voltage across conductors 24a and 24b is not independently responsive to shearing forces either in the XZ or YZ planes.

Similarly, if stress tensor coefficient $e_{15}$ and $e_{25}$ both were non-zero, the electric polarization parallel to the Y-axis, and hence the output across conductors 23a and 23b (as shown in FIG. 1), would be obtained both when the bar was subjected to a shearing force in the YZ plane ($P_2 = e_{24}S_4$) and when it was subjected to a shearing force in the XZ plane ($P_2 = e_{25}S_5$).

The discussion this far has been limited to the phenomenon wherein a shearing force exerted on the piezoelectric material results in the generation of an electric polarization. However, the electric polarization and shearing forces are interrelated; that is, not only does a shearing force exerted on the piezoelectric material cause such an electric polarization, but also, if an electric polarization is created in the crystal, a shearing strain in the material will result.

Thus, e.g., if an external electromotive force (voltage) were applied across conductors 24a and 24b (see FIG. 1), an electric polarization $P_1$ would result in the piezoelectric material between electrodes 22a and 22b. This would cause shearing strains in the material related to the electric polarization by the appropriate stress coefficient, as given in FIG. 2. This shearing strain in turn would cause motion of the piezoelectric material, assuming the bar was not mounted in such a way as to restrict or prevent this motion. Note also that the direction of the motion is dependent on the sense of the applied electromotive force. Thus if the polarity of the applied voltage were reversed, motion in the opposite direction would result.

From the foregoing discussion it should be obvious that to achieve the objectives of the invention, the bar 1 should be selected from a piezoelectric material which has non-zero stress coefficients along one diagonal of a 2 x 2 submatrix of FIG. 2, and stress coefficients along the other diagonal of the submatrix which both are zero. For example, a material with non-zero stress coefficients $e_{14}$ and $e_{25}$, and zero valued coefficients $e_{15}$ and $e_{24}$ would be appropriate. Similarly, a material with zero-valued coefficients $e_{14}$ and $e_{25}$, and non-zero coefficients $e_{15}$ and $e_{24}$ also would be satisfactory.

Should bar 1 be selected from a piezoelectric material having non-zero stress tensor coefficients $e_{15}$ and $e_{24}$, and zero valued coefficients $e_{14}$ and $e_{25}$, then the electric polarization parallel to the X-axis will be proportional to shearing forces parallel to the X axis ($P_1 = e_{15}S_5$) and completely non-responsive to shearing forces parallel to the Y-axis. Also, the shearing force developed along the X-axis will only be responsive to an electric polarization parallel to the X-axis. Similarly, the electric polarization parallel to the Y-axis will be proportional to shearing forces parallel to the Y-axis ($P_2 = e_{24}S_4$), but competely nonresponsive to shearing forces along the X-axis. Alternatively stated, the electric polarization along each of two orthogonal axes will be interrelated or mutually responsive to shearing forces along the same axis, and nonresponsive to shearing forces along the other orthogonal axis.

Should bar 1 be selected from a piezoelectric material having non-zero stress tensor coefficients $e_{14}$ and $e_{25}$, and zero-valued coefficients $e_{15}$ and $e_{24}$, then the electric polarization along the X or Y-axes will be interrelated or mutually responsive only to shearing forces parallel to the orthogonal axis. For example, the electric polarization $P_1$ parallel to the X-axis will be proportional to a shearing strain $S_4$ along the Y-axis, by the relationship $P_1 = e_{14}S_4$, and nonresponsive to a shearing strain parallel to the X-axis.

Should the piezoelectric material selected for the transducer have its faces cut at some angle to the crystallographic axes, rather than parallel to these axes, the same theoretical treatment as discussed above would apply. However, the stress tensor coefficients must be expressed with reference to a set of transformed axes X′, Y′, Z′, and the coefficients of FIG. 2 would assume different values.

Fourteen of the twenty classes of piezoelectric crystals have appropriate stress tensor coefficient values so as to effect shearing forces in two planes at right angles to each other, each of which is mutually responsive to an electric polarization along only one of two orthogonal axes. These classes are listed in Table I below Table I (1) Monoclinic Hemimorphic
(2) Monoclinic Hemihedral
(3) Rhombic Hemihedral
(4) Rhombic Hemimorphic
(5) Tetragonal Tetartohedral with inversion axis
(6) Tetragonal Hemihedral with inversion axis
(7) Tetragonal Enantiomorphus Hemihedral
(8) Tetragonal Hemimorphic Hemihedral
(9) Trigonal Enantiomorphus Hemihedral
(10) Trigonal Hemimorphic Hemihedral
(11) Hexagonal Enantiomorphus Hemihedral
(12) Hexagonal Hemimorphic Hemihedral
(13) Cubic Tetartohedral
(14) Cubic Hemimorphic Hemihedral A complete set of stress coefficients for each of the twenty classes of piezoelectric crystals, including the fourteen classes listed above, is contained on pages 190 to 192 of the text entitled "Piezoelectricity" by Walter Guyton Cady, published in 1964 by Dover Publications, Inc., New York, N.Y.

Any of the fourteen classes of piezoelectric crystals listed in Table I above may be used as the material for bar 1 of a transducer of the type disclosed herein. However, there are two further characteristics which would be desirable in a preferred embodiment of the invention.

First, it is desirable that the long axis of bar 1 lie in the plane of both shearing forces, that is, the long axis should be parallel to the Z-axis as shown in FIGS. 3a and 3b, assuming the shearing forces to be parallel to the XZ and YZ planes. This, e.g., would allow bar 1 to flex parallel to either the XZ or YZ planes.

Second, it is also desirable that the two non-zero diagonal stress tensor coefficients which relate the electric polarization to the shearing strains in two orthogonal axes be equal in magnitude (although they may be of opposite sense). This would mean, e.g., that if bar 1 had a square cross section, and if voltages of equal magnitude were applied across conductors 23a and 23b, and conductors 24a and 24b (see FIG. 1), bar 1 would move equally far in the XZ plane as in the YZ plane (see, e.g., FIGS. 3a and 3b). Alternatively, application of shearing forces of equal magnitude along two orthogonal directions would result in equal electric polarization value in two planes at mutually right angles.

These two additional desirable characteristics are satisfied by the nine classes of piezoelectric crystals designated 6 through 14 inclusive in Table I above. Clearly, any material belonging to these nine classes could be used to construct bar 1 of the preferred embodiment of the transducer which is the subject of this application. Table II below lists several typical materials which are members of these nine classes, together with the pairs of non-zero stress tensor coefficients which would be utilized in a transducer of the type disclosed herein.

Table II

| Material | Coefficients |
| --- | --- |
| Ammonium phosphate | $e_{14}$ and $e_{25}$ |
| Potassium phosphate | $e_{14}$ and $e_{25}$ |
| Quartz | $e_{14}$ and $e_{25}$ |
| Tourmaline | $e_{15}$ and $e_{24}$ |
| Ceramic | $e_{15}$ and $e_{24}$ |

Thus far, the effects of non-zero stress coefficients on the left side of FIG. 2 have been neglected. These coefficients, which are related to compressional or extensional strains in the piezoelectric material, may in some cases produce periodic changes in the length, breadth or thickness dimensions of bar 1 when an electromotive force is applied to the bar. However, since the changes are of opposite sense during each half of their cycle, the net effect is zero. Moreover, this periodic deformation occurs at a natural vibrational frequency which is very high in comparison with the fundamental flexural frequency of the bar.

As an example, when there are nonvanishing coefficients in the same horizontal row (see FIG. 2) as the coefficient being employed, the rectangular cross section of bar 1 will be deformed into a parallelogram; however, the parallelogram will assume opposite inclinations during each half of its natural vibrational cycle, so that it will cause no net motion or flexure of the bar.

Referring now to FIG. 4, there is shown another embodiment of the invention. Specifically, there is shown an elongated right parallelepiped shaped bar 1 of a piezoelectric material selected from among those classes listed in Table I, and optimally, but not necessarily selected from classes 6 through 14 inclusive of Table I. As described earlier in conjunction with FIGS. 1, 3a and 3b, bar 1 may have its principal crystallographic axes respectively parallel to its surfaces. Electrodes 21a, 21b, 22a and 22b, which are coupled to the major faces of bar 1, and electrical conductors 23a, 23b, 24a and 24b function in the same manner as described in connection with FIG. 1.

As indicated in FIG. 4, one end of bar 1 is fixedly attached to a base 30 which may be used to couple mechanical energy to or from bar 1. The other end of bar 1 is free to move or vibrate. If desired, a small mass 31 may be attached to this free end of bar 1 to lower the natural flexural frequency of the bar.

In the embodiment of FIG. 4, the piezoelectric transducer is sensitive independently to motion of base 30 parallel to the X or Y axes in the plane XY. Thus, if base 30 were moved parallel to the X axis, bar 1 would exhibit flexure in the XZ plane, similar to that illustrated in FIG. 3a. This results in the generation of electric polarization either parallel to the X-axis (if a material with a non-zero $e_{15}$ coefficient were used for bar 1) or along the Y-axis (if a material with non-zero $e_{25}$ coefficient were used). If base 30 were moved parallel to the Y-axis, in the XY plane, bar 1 would exhibit flexure in the YZ plane, similar to that shown in FIG. 3b. This would result in the generation of electric polarization along the Y-axis (non-zero $e_{24}$ coefficient) or along the X-axis (non-zero $e_{14}$ coefficient).

Recall that the electric polarization generated due to a shearing strain of bar 1 causes an output voltage to appear across the pair of electrodes whose faces are perpendicular to the direction of polarization. Thus, in FIG. 4, if we assume that bar 1 is of ceramic material having nonvanishing $e_{15}$ and $e_{24}$ coefficients, when base 30 is moved parallel to the X-axis (in the XY plane) a voltage appears across conductors 24a and 24b. Similarly, when base 30 is moved parallel to the Y-axis, a voltage appears across conductors 23a and 23b. When base 30 is moved simultaneously in the X and Y directions, output voltages appear across both sets of conductors, which voltages independently are indicative of the two components of motion of the base.

In some transducer applications it may be desirable to reduce the natural flexural frequency of bar 1 to bring it into or near resonance with a time varying driving force. For this purpose, a load may be attached to bar 1. For example, a mass such as weight 31 may be affixed to a free end of bar 1, as shown in FIG. 4, to serve as an inertial load.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A transducer comprising:
   a piezoelectric crystal having first and second orthogonal axes, said crystal having its electric polarization along said first axis interrelated with the shearing forces parallel to one of said first and second axes, and its electric polarization along said second axis interrelated with the shearing forces parallel to the other one of said first and second axes, said crystal comprising a piezoelectric material having non-zero stress coefficients along one diagonal of a 2 x 2 submatrix of shearing stress coefficients and having zero-valued stress coefficients along the other diagonal of said submatrix; and
   first and second means for coupling electrical energy to or from said crystal.
2. A transducer as defined by claim 1 wherein said first and second means for conducting electrical energy each comprises a pair of electrodes disposed on opposite ends of said axes.
3. A transducer as defined by claim 1 wherein said crystal has a third axis orthogonal to said first and second axes and wherein is included means for coupling mechanical energy to or from said crystal, said means for coupling comprising base means affixed to said crystal at one end of said third axis.

4. A transducer as defined by claim 1 wherein said crystal comprises a material selected from the group consisting of ammonium phosphate, potassium phosphate, quartz, tourmaline and barium titanate.

5. A transducer as defined by claim 1 wherein said crystal comprises one of rectangular cross section, and wherein said first and second orthogonal axes are perpendicular respectively to two adjacent edges of said rectangular cross section.

6. A transducer as defined by claim 1 including a weight fixedly attached to said crystal.

7. A transducer comprising:

an elongated bar of piezoelectric material having rectangular cross section, said material selected from the group of piezoelectric crystal classes consisting of tetragonal hemihedral with inversion axes, tetragonal enantiomorphous hemihedral, tetragonal hemimorphic hemihedral, trigonal enantiomorphous hemihedral, trigonal hemimorphic hemihedral, hexagonal enantiomorphous hemihedral, hexagonal hemimorphic hemihedral, cubic tetartohedral, and cubic hemimorphic hemihedral, said bar being substantially homogeneous and characterized in having non-zero stress coefficients along one diagonal of a 2 x 2 submatrix of shearing stress coefficients and having zero-valued stress coefficients along the other diagonal of said submatrix; and first and second means for conducting electrical energy to or from said bar, each means comprising a pair of electrodes disposed on opposite sides of said bar, whereby the electrical energies conducted respectively to said first and second means are independently interrelated to shearing forces parallel respectively to first and second orthogonal axes through said bar.

8. A transducer as defined by claim 7 including base means fixedly attached to one end of said bar for transmitting motion to said bar.

9. A transducer as defined by claim 7 including a load attached to said bar to lower its natural flexure frequency.

References Cited

UNITED STATES PATENTS

| | | | |
|---|---|---|---|
| 1,907,427 | 5/1933 | Marrison | 310—9.8 |
| 1,830,328 | 11/1931 | Nicolson | 310—9.8 |
| 1,746,788 | 2/1930 | Marrison | 310—9.8 |
| 2,830,204 | 4/1958 | Harris | 310—9.6 |
| 2,944,117 | 7/1960 | Gray | 310—8.5 |
| 3,032,706 | 5/1962 | Wieder | 310—9.8 |
| 3,128,397 | 4/1964 | Shinada | 310—9.8 |
| 3,311,817 | 3/1967 | Glanc | 310—9.8 |
| 3,371,234 | 2/1968 | Cady | 310—8.4 |

FOREIGN PATENTS

| | | |
|---|---|---|
| 1,104,237 | 9/1959 | Germany. |
| 1,113,477 | 1/1959 | Germany. |

J. D. MILLER, *Primary Examiner.*

U.S. Cl. X.R.

310—8.5, 9.5, 9.7, 9.8